US012345085B2

(12) United States Patent
Kromer

(10) Patent No.: US 12,345,085 B2
(45) Date of Patent: Jul. 1, 2025

(54) DRIVE DEVICE FOR ADJUSTING A VEHICLE ASSEMBLY

(71) Applicant: Brose Fahrzeugteile SE & Co. Kommanditgesellschaft, Bamberg, Bamberg (DE)

(72) Inventor: Alex Kromer, Stegaurach (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 222 days.

(21) Appl. No.: 17/632,531

(22) PCT Filed: Aug. 5, 2020

(86) PCT No.: PCT/EP2020/071971
§ 371 (c)(1),
(2) Date: Feb. 3, 2022

(87) PCT Pub. No.: WO2021/023760
PCT Pub. Date: Feb. 11, 2021

(65) Prior Publication Data

US 2022/0290481 A1 Sep. 15, 2022

(30) Foreign Application Priority Data

Aug. 5, 2019 (DE) ..................... 10 2019 211 716.3

(51) Int. Cl.
*E05F 15/611* (2015.01)

(52) U.S. Cl.
CPC ....... *E05F 15/611* (2015.01); *E05Y 2201/418* (2013.01); *E05Y 2201/434* (2013.01); (Continued)

(58) Field of Classification Search
None
See application file for complete search history.

(56) References Cited

U.S. PATENT DOCUMENTS

| | | | | |
|---|---|---|---|---|
| 10,180,024 | B2 * | 1/2019 | Urase | B60J 5/06 |
| 2012/0146556 | A1 * | 6/2012 | Eggeling | H02P 5/68 49/358 |

(Continued)

FOREIGN PATENT DOCUMENTS

| | | | |
|---|---|---|---|
| DE | 19927871 | A1 | 11/1999 |
| DE | 10117935 | A1 | 10/2002 |

(Continued)

OTHER PUBLICATIONS

Inventus Engineering GmbH, Machine Translations from documents in U.S. Appl. No. 17/430,103, pp. 1-97 (Year: 2019).*

(Continued)

*Primary Examiner* — Jelani A Smith
*Assistant Examiner* — Davin Seol
(74) *Attorney, Agent, or Firm* — Dickinson Wright PLLC

(57) ABSTRACT

A drive device for adjusting a vehicle assembly including an electromotive adjustment drive for adjusting the vehicle assembly and a control device for controlling the adjustment drive, the control device is configured to actuate the adjustment drive in a holding mode for holding the vehicle assembly. It is provided that the control device includes a regulation module for regulating a characteristic variable of the adjustment drive and a control module, wherein the regulation module is configured to determine a correcting variable for regulating the characteristic variable of the adjustment drive in the holding mode with reference to a specified setpoint value, and the control module is configured to evaluate a change of the correcting variable to detect an adjustment request for adjusting the vehicle assembly.

16 Claims, 4 Drawing Sheets

(52) U.S. Cl.
CPC ....... *E05Y 2400/31* (2013.01); *E05Y 2400/35* (2013.01); *E05Y 2400/36* (2013.01); *E05Y 2900/531* (2013.01)

(56) References Cited

U.S. PATENT DOCUMENTS

| | | | | |
|---|---|---|---|---|
| 2015/0275563 | A1 | 10/2015 | Fujimoto et al. | |
| 2016/0026191 | A1* | 1/2016 | Fujimoto | H02P 31/00<br>701/49 |
| 2016/0201377 | A1* | 7/2016 | Nishikibe | E05F 15/41<br>49/28 |
| 2018/0183361 | A1* | 6/2018 | Kadoya | H02P 3/12 |
| 2018/0328097 | A1* | 11/2018 | Holt | B60J 5/04 |
| 2019/0249349 | A1* | 8/2019 | Han | E05F 3/20 |
| 2020/0408021 | A1* | 12/2020 | Aoki | E05F 15/75 |
| 2022/0149761 | A1* | 5/2022 | Battlogg | H02P 6/17 |

FOREIGN PATENT DOCUMENTS

| | | | | |
|---|---|---|---|---|
| DE | 102004052590 | A1 | 5/2006 | |
| DE | 202007002404 | U1 | 11/2007 | |
| DE | 102013201436 | A1 | 7/2014 | |
| DE | 102014225150 | A1 | 6/2016 | |
| DE | 102015215627 | A1 | 2/2017 | |
| DE | 102017111138 | A1 | 11/2017 | |
| DE | 102016216673 | A1 | 3/2018 | |
| DE | 102017115024 | A1 | 1/2019 | |
| DE | 102017118894 | A1 | 2/2019 | |
| DE | 102017218288 | A1 | 4/2019 | |
| DE | 102017223762 | A1 | 6/2019 | |
| JP | 2000356069 | A | 12/2000 | |
| WO | 2017083706 | A1 | 5/2017 | |
| WO | WO-2017211567 | A1 * | 12/2017 | E05F 15/611 |

OTHER PUBLICATIONS

Norm DIN ISO 8855 2013-11-00. Straßenfahrzeuge—Fahrzeugdynamik und Fahrverhalten—Begriff (ISO 8855:2011) (Road vehicles—Vehicle dynamics and road-holding ability—Vocabulary). 51.

* cited by examiner

DRIVE DEVICE FOR ADJUSTING A VEHICLE ASSEMBLY

CROSS-REFERENCE TO RELATED APPLICATIONS

This application is the U.S. National Phase of PCT Application No. PCT/EP2020/071971 filed on Aug. 5, 2020, which claims priority to German Patent Application No. DE 10 2019 211 716.3, filed on Aug. 5, 2019, the disclosures of which are hereby incorporated in their entirety by reference herein.

TECHNICAL FIELD

This present disclosure relates to a drive device for adjusting a vehicle assembly.

BACKGROUND

Drive devices for adjusting a vehicle assembly may include an electromotive adjustment drive for adjusting the vehicle assembly and a control device for controlling the adjustment drive. The control device is configured to actuate the adjustment drive to hold the vehicle assembly in a holding mode.

Such a vehicle assembly for example can be a door or flap on a motor vehicle. A door can be formed for example by a vehicle side door pivotally arranged on a vehicle body or also by a liftgate or a sliding door. However, the vehicle assembly for example can also be a sliding roof.

Usually, in an automatic mode, liftgates for example are electromotively traversed between defined positions, for example between an open position and a closed position. In a liftgate, but also in a vehicle side door, it may be desirable that in addition to an automatic electromotive adjustment, a manual adjustment is also possible, which however is supported by an electric motor. This is referred to as a servo mode.

In such a servo mode it is desirable that the force to be applied by a user remains at least approximately the same over an adjustment path of the vehicle assembly, and thus it is possible for a user to adjust the vehicle assembly for example between an open position and a closed position, smoothly, comfortably and in a haptically pleasant way by applying an approximately uniform user force. It should be possible to provide a servo mode at low cost, such as without the use of additional, expensive sensor system for measuring the force actually applied by a user or also by a drive.

In addition, it is desirable that in a holding mode a vehicle assembly, such as a liftgate or a vehicle side door, is fixed safely and reliably and thus held in position without external forces leading to an uncontrolled, inadvertent adjustment of the vehicle assembly. For this purpose, the adjustment drive for example can be actively energized so that the vehicle assembly (at least over a certain period) is actively held in position.

In such a holding mode, however, it is required to detect whether a user wants to adjust the vehicle assembly for example by touching the vehicle assembly from the position just taken. When such an adjustment request is detected, the vehicle assembly will be enabled in order to provide for a manual adjustment of the vehicle assembly in a servo mode with the support of an electric motor or in a purely manual operation without the support of an electric motor, or an electromotive adjustment of the vehicle assembly will be initiated in an automatic mode.

SUMMARY

One or more objects of the present disclosure may include providing a drive device for adjusting a vehicle assembly, which in a simple way to be implemented at low cost provides for a detection of an adjustment request in a holding mode.

Accordingly, the control device includes a regulating module for regulating a characteristic variable of the adjustment drive and a control module. The regulating module is configured to determine a correcting variable for regulating the characteristic variable of the adjustment drive in the holding mode with reference to a specified setpoint value, and the control module is configured to evaluate a change of the correcting variable for detecting an adjustment request for the adjustment of the vehicle assembly.

In the holding mode, energizing the adjustment drive via the control device is effected via a regulation during which for example the current or the speed of the adjustment drive can be regulated. For this purpose, a regulating module of the control device is designed to regulate a characteristic variable (for example corresponding to the current or the speed) of the adjustment drive with reference to a specified setpoint value so that the characteristic variable of the adjustment drive is adjusted to the setpoint value. For this purpose, the control module of the control device determines a correcting variable with reference to which the characteristic variable of the adjustment drive is set and hence regulated.

In the drive device, holding of the vehicle assembly in the holding mode is effected by actively actuating the adjustment drive and thus (at least over a certain period) in a powered way. To hold the vehicle assembly in the position just taken, the adjustment drive is regulated by the regulating module of the control device in such a way that forces acting on the vehicle assembly, for example due to gravity depending on an inclination or slope on a vehicle, are just compensated and thus, by energizing the adjustment drive, such a force is generated on the vehicle assembly that the vehicle assembly is reliable held in position.

Because the characteristic variable of the adjustment drive, for example the current, is regulated with reference to the setpoint value and thus is set with reference to the setpoint value, a load change at the adjustment drive, for example due to a user intervention at the vehicle assembly, cannot be detected with reference to the actual value of the characteristic variable. To detect an adjustment request, the control module therefore is configured to evaluate not the characteristic variable of the adjustment drive, but the correcting variable with reference to which the characteristic variable of the adjustment drive is set. When a change in the correcting variable is obtained, this may indicate that a load change has occurred at the vehicle assembly, which may be caused by a user intervention, so that with reference to a change in the correcting variable a user intervention can be inferred.

A detection of an adjustment request of a user thus can be detected without using particular sensors, for example a gyro sensor or an acceleration sensor at the vehicle assembly, for example at a vehicle door. This provides for a reliable, sensible detection of an adjustment request. In addition, an adjustment request possibly can be detected faster than with already low forces to be applied by a user so that handling is improved for a user, with an advantageous haptic perception during actuation.

The correcting variable for example can be a voltage value with reference to which the motor voltage is set via pulse width modulation and supplied to the adjustment drive.

In one embodiment, the control module is configured to identify an adjustment request when a change of the correcting variable crosses a predetermined threshold value. In the case of a load change at the vehicle assembly, an adjustment request will be identified when the change of the correcting variable resulting from the load change is greater in amount than a predetermined threshold value.

The change of the correcting variable can also be used to identify a direction of an adjustment request. Thus, a user intervention can act in the same direction as a force action due to energization of the adjustment drive or can be opposite to the force action of the adjustment drive. Correspondingly, the correcting variable can decrease or increase, which can be evaluated by the control module in order to determine whether a user intervention exists for example in the direction of opening or in the direction of closing a vehicle assembly, for example a vehicle side door.

In one embodiment, the control module is configured to determine a change of the correcting variable with reference to the difference of a value of the correcting variable to a sampling point and a reference value of the correcting variable at a preceding sampling point (the correcting variable is changed with a predetermined frequency at, for example, temporal sampling points). For example, the correcting variable can be monitored in order to initially fix a reference value with reference to a change of the correcting variable and to then calculate the difference with respect to the reference value. For example, when a change in the correcting variable exceeding a trigger threshold is obtained between two consecutive sampling points (over time), the value of the correcting variable at the first, earlier sampling point is fixed as a reference value. Proceeding from this reference value, the change of the correcting variable in the further course then is measured in order to determine whether the correcting variable crosses a predetermined threshold value in the further course. In this case, an adjustment request is identified. If this is not the case for example within a predetermined number of sampling points, the reference value is reset and the holding mode is continued.

In one embodiment, the control module is configured to terminate the holding mode upon detection of an adjustment request. When an adjustment request is detected, an adjustment of the vehicle assembly thus is made possible, for example by switching into a servo mode for a manual adjustment of the vehicle assembly with the support of an electric motor.

In one embodiment, the control device is configured to actuate the adjustment drive in a servo mode to provide a supporting force during a manual adjustment of the vehicle assembly by a user. For this purpose, the control device includes a servo regulation module for determining a setpoint current value in dependence on a load acting on the vehicle assembly and a current regulation module for regulating a current of the adjustment drive, wherein the current regulation module is configured to regulate the current of the adjustment drive in the servo mode with reference to the setpoint current value.

The regulation module used for the holding mode can correspond to the current regulation module for the servo mode. In this case, a current regulation is also effected in the holding mode. The regulation module for the holding mode and the current regulation module for the servo mode, however, can also be configured as separate modules (for example in the form of software modules).

In the servo mode, the drive device can be operated for the manual, but electromotively supported adjustment of the vehicle assembly. In the servo mode, the adjustment drive is controlled such that the adjustment drive provides a supporting force for a manual adjustment of the vehicle assembly, and the force to be applied by a user possibly is the same over the adjustment path or a part of the adjustment path of the vehicle assembly or follows a desired curve.

In the servo mode a current regulation is effected, wherein a setpoint current value generated by the servo regulation module is supplied to the current regulation module, and the current regulation is effected in a current regulation module with reference to the setpoint current value obtained from the servo regulation module. The servo regulation module is adapted to set the setpoint current value such that the force provided by the adjustment drive supports the user in the movement of the vehicle assembly in such a way that the force to be applied by the user possibly is at least approximately the same (or follows a desired curve) and thus a comfortable, haptically pleasant adjustment of the vehicle assembly is obtained for the user.

In one embodiment, the control device includes a load calculation module preceding the servo regulation module, which serves to determine a load acting on the vehicle assembly. The load is a load acting on the vehicle assembly independently of an applied user force, which may counteract an adjustment of the vehicle assembly (or possibly can also support the movement of the vehicle assembly) and for example can depend on the vehicle position, an angle of a hinge axis of the vehicle assembly configured as a vehicle door and on a current adjustment position of the vehicle assembly.

The load calculation module may be adapted to determine a static and/or dynamic load acting on the vehicle door. The load can be determined for example in dependence on an inclination angle of the vehicle measured about a longitudinal vehicle axis, an inclination angle of a hinge axis of the vehicle assembly (which in this case is configured for example as a vehicle side door pivotally arranged on a vehicle body) measured about the longitudinal vehicle axis, a slope angle of the vehicle measured about a transverse vehicle axis, a slope angle of the hinge axis of the vehicle assembly measured about the transverse vehicle axis and/or an opening angle of the vehicle assembly.

In dependence on the inclination of the vehicle and the inclination of the hinge axis of the vehicle assembly (measured about the longitudinal vehicle axis, also referred to as roll angle) and/or in dependence on the slope of the vehicle and the slope of the hinge axis (measured about the transverse vehicle axis, also referred to as pitch angle), forces of gravity act on the vehicle assembly, for example on a vehicle side door pivotally arranged on the vehicle body. Such forces of gravity can act for example in the direction of a closed position of a vehicle door and thus counteract for example an opening of the vehicle door. Thus, on opening of the vehicle door, a user must work against a torque acting on the vehicle assembly due to gravity, and the supporting force provided by the adjustment drive is to be set such that the force to be applied by the user remains the same independently of the position of the vehicle and the position of the vehicle assembly or follows a desired curve. The supporting force to be provided by the adjustment drive thus changes with the vehicle position and the position of the vehicle assembly and correspondingly is specified such that, as an example, an at least approximately constant adjusting force is obtained for a user in the servo mode.

In addition, friction forces can act on the vehicle assembly, which likewise can be employed by the load calculation module for calculating the load acting on the vehicle assembly.

Additionally or alternatively, other forces can also be included, such as wind forces which act on the vehicle assembly.

In one embodiment, the servo regulation module is configured to use a load acting on the vehicle assembly, as it is calculated by the load calculation module and supplied to the servo regulation module, and in addition a target force value to be applied by a user, in order to determine a setpoint torque to be provided by the adjustment drive. The target force value corresponds to the desired force which a user has to apply on adjustment of the vehicle assembly. The setpoint current value is to be specified by the servo regulation module for a current regulation so that the adjustment drive provides a torque that supports the user on adjustment of the vehicle assembly in such a way that the user at least approximately only has to apply a force corresponding to the target force value.

The load that is calculated by the load calculation module can have a static component and a dynamic component. The load can be determined with reference to a static hinge moment acting about a hinge axis of the vehicle assembly and a dynamic hinge moment acting about the hinge axis of the vehicle assembly. The static hinge moment can be obtained from moment components resulting from the action of gravity on the vehicle assembly in dependence on the inclination angle and the slope angle of the vehicle and the hinge axis, and in addition from a friction moment acting on the hinge axis. The dynamic hinge moment, on the other hand, can result from inertial forces, for example, and thus is a measure of the inertia of the vehicle door and of a door acceleration.

When the static hinge moment and the dynamic hinge moment are known, the setpoint torque to be provided by the adjustment drive can be calculated with reference to a torque balance to be $$M_{setpoint\_hinge}=M_{hinge\_stat}+M_{hinge\_dyn}-M_{user},$$

wherein $M_{setpoint\_hinge}$ indicates the setpoint torque, $M_{hinge\_stat}$ indicates the static hinge moment, $M_{hinge\_dyn}$ indicates the dynamic hinge moment and $M_{user}$ indicates the user moment. The static hinge moment and the dynamic hinge moment here have a positive effect on the torque balance. The user moment to be applied by a user on the other hand has a positive or negative effect on the balance depending on the direction of movement. The setpoint torque indicates the torque to be provided by the adjustment drive, which corresponds to the total torque required for adjusting the vehicle assembly minus the user moment.

With reference to the setpoint torque the servo regulation module then in one embodiment determines the setpoint current value and in the servo mode supplies this setpoint current value to the current regulation module. In the current regulation module, a current regulation then is effected with reference to the setpoint current value provided by the servo regulation module.

In one embodiment, the current regulation module is configured to set the current of the adjustment drive by using a pulse width modulation. In the current regulation module, a current regulation is effected with reference to the supplied setpoint current value. The current regulation module here outputs a correcting variable with reference to which the voltage supplied to the adjustment drive is set by using a pulse width modulation of high frequency, for example with a frequency between 5 kHz and 100 kHz or even higher.

In the current regulation module, a regulation is effected with reference to the supplied setpoint current value and the resulting, actual motor current. The current of the adjustment drive thus is set by regulation such that it corresponds to the specified setpoint current value.

Due to the electromotive support of the manual adjustment of the vehicle assembly in the servo operating mode via current regulation, the force to be applied by a user can be set to a desired target force value, and the regulation can be effected in such a way that the force to be applied by the user remains at least approximately the same over the adjustment path of the vehicle assembly or follows a desired curve. Thus, a manual adjustment of the vehicle assembly by a user in the servo operating mode can be effected easily, comfortably and in a haptically pleasant way.

In the servo operating mode, the provision of the supporting force here follows the movement of a user, and in particular an undesired run-on, i.e. a further adjustment after termination of a user actuation, can be avoided. The user is free to choose the adjustment speed. The adjustment drive merely provides a supporting force that is variably set by a user in dependence on the adjusting movement of the vehicle assembly.

BRIEF DESCRIPTION OF THE DRAWINGS

The idea underlying the invention will be explained in detail below with reference to the exemplary embodiments illustrated in the Figures. In the drawing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A door drive device for adjusting a vehicle side door is known for example from DE 10 2015 215 627 A1 and for example includes an adjustment drive which via a transmission element in the form of a traction cable is coupled with an adjustment part in the form of a catch strap articulated to the vehicle body. By adjusting a cable drum coupled with the transmission element, the vehicle side door can be pivoted relative to the vehicle body, wherein the door drive device includes a coupling which provides for a manual adjustment of the vehicle side door independently of the adjustment drive.

Figure 1:
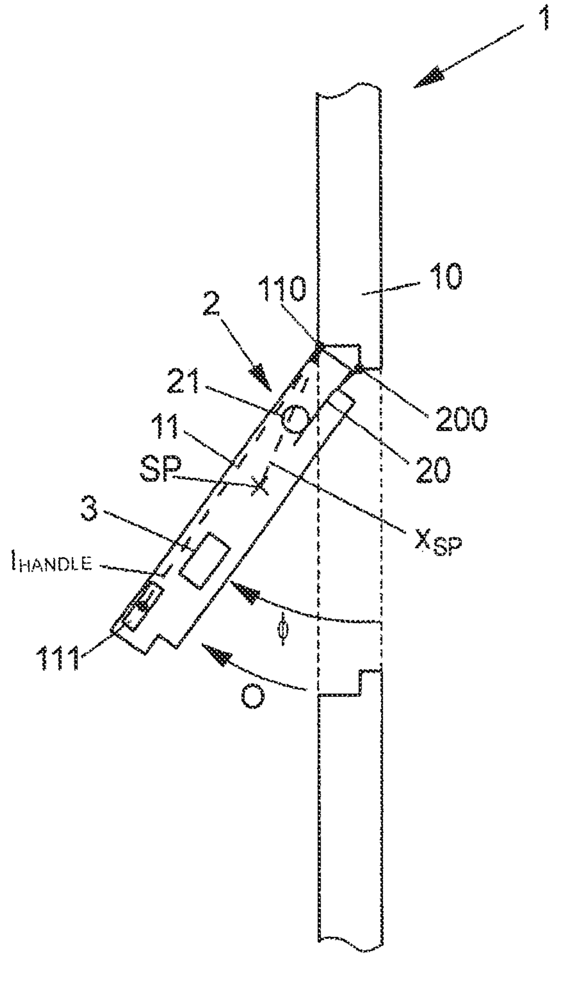
FIG. 1 shows a schematic view of a vehicle assembly in the form of a vehicle side door.

FIG. 1 shows a schematic view of a vehicle assembly 11 in the form of a vehicle side door arranged on a vehicle body 10 of a motor vehicle 1, which is pivotable relative to the vehicle body 10 about a hinge axis 110 and can be pivoted between a closed position and an open position along an opening direction O.

A drive device 2, which is configured for example in the manner of the door drive described in DE 10 2015 215 627 A1, serves for electromotively adjusting the vehicle assembly 11 and includes an adjustment drive 21 which for example is stationarily arranged on the vehicle assembly 11, for example on a door module enclosed in a door interior space of the vehicle assembly 11 in the form of the vehicle side door, and is operatively connected to an adjustment part 20 for example in the form of a catch strap articulated to the vehicle body 10 at a joint axis 200.

For example, the adjustment drive 21 can include a cable drum that is coupled with a traction cable arranged on the adjustment part 20 in such a way that by rotating the cable drum the adjustment part 20 is moved relative to the adjustment drive 21 and the vehicle assembly 11 thereby can be pivoted relative to the vehicle body 10 about the hinge axis 110, as this is described in DE 10 2015 215 627 A1. However, other mechanisms are also conceivable and possible for a drive device 2, which provide for an electromotive adjustment of the vehicle assembly 11 with respect to the vehicle body 10.

At this point reference should also be made to the fact that the drive device 2 of the type described in this text is not limited to the use on a vehicle side door, but generally can be employed for adjusting a vehicle assembly, for example a vehicle door in the form of a swing door or sliding door, for adjusting a liftgate or also for adjusting a sliding roof.

The drive device 2 will enable an automatic mode and a servo mode and thus can effect an automatic adjustment of the vehicle assembly 11 or a manual adjustment of the vehicle assembly 11 by a user, which however is electromotively supported by the drive device 2. In the illustrated exemplary embodiment, the drive device 2 therefor can be switched between different operating modes, in which the adjustment drive 21 is controlled in a different way depending on the respectively set operating mode.

While in the automatic mode a regulation to a predetermined speed will be effected in order to move the vehicle assembly 11 between different positions, for example a closed position and an open position, with a predetermined adjustment speed, a torque will be provided by the adjustment drive 21 in the servo mode, which torque effects that a user force to be additionally applied by a user effects an adjustment of the vehicle assembly 11. The user force to be applied by the user here will be at least approximately the same over the adjustment path of the vehicle assembly 11, i.e. in the example of FIG. 1 over the adjustment angle $\phi$ between the closed position and a completely open position, or follow a desired curve, in order to provide a comfortable, haptically pleasant adjustment for the user.

In addition to the automatic mode and to the servo mode, the drive device 2 will have a holding mode in which the vehicle assembly 11 is fixed via the drive device 2 and thus is held in the position just taken, for example in a partly or completely open position.

Figure 2A:
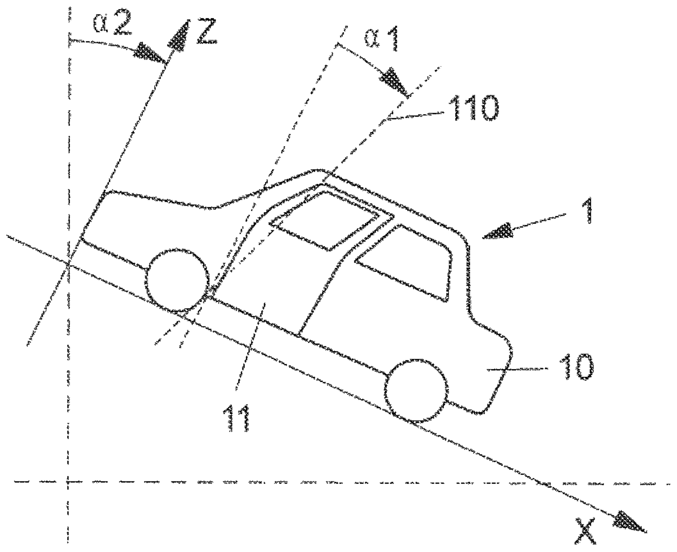
FIG. 2A shows a view for illustrating a slope angle of a vehicle and a slope angle of a hinge axis of a vehicle side door.
Figure 2B:
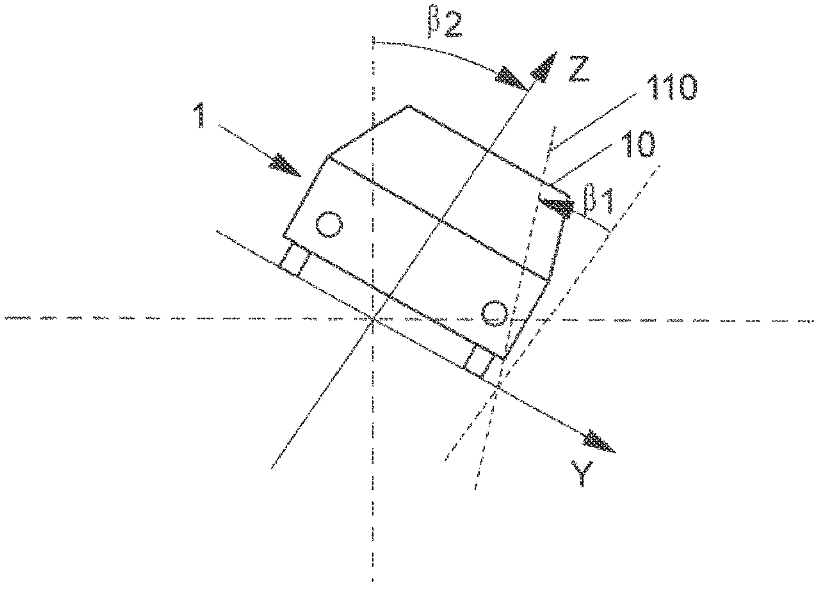
FIG. 2B shows a view for illustrating an inclination angle of a vehicle and an inclination angle of a hinge axis of a vehicle side door.

FIGS. 2A and 2B (in representations exaggerated for illustration) show different vehicle positions and resulting positions of the hinge axis 110 of a vehicle assembly 11 in the form of a vehicle side door pivotally arranged on the vehicle body 10.

FIG. 2A shows a vehicle 1 which for example is parked on a slope with a gradient and correspondingly has a slope angle α2 between the vertical vehicle axis Z and a vertical (determined by the direction of gravity). In addition, the hinge axis 110 of the vehicle assembly 11 has a slope angle α1 relative to the vertical vehicle axis Z. The slope angle α2 of the vehicle 1 and the slope angle α1 of the hinge axis 110 relative to the vertical axis Z are measured about the transverse vehicle axis Y (see FIG. 2B).

FIG. 2B on the other hand shows a vehicle 1 that is inclined about the longitudinal vehicle axis X (see FIG. 2A). The vertical vehicle axis Z in this case has an inclination angle β2 relative to the vertical. In addition, the hinge axis 110 can have an inclination angle β1 relative to the vertical vehicle axis Z.

As will be explained below, the vehicle position is included in the calculation of the torque to be provided by the adjustment drive 21 in the servo operating mode, which torque will support a user during an adjustment of the vehicle assembly 11.

Figure 3:
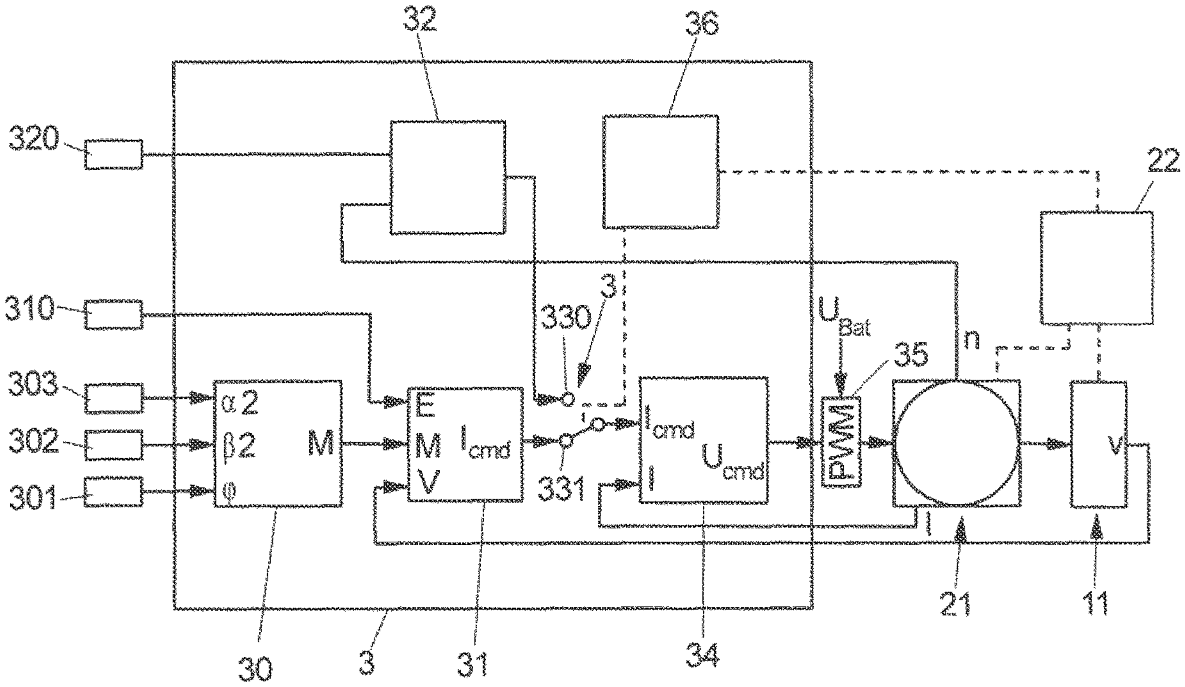
FIG. 3 shows a functional view of a control device of a drive device.

A control device 3 for controlling the adjustment drive 21 of the drive device 2, which is shown in FIG. 3 in an exemplary embodiment, includes different regulation modules which depending on the operating mode serve to set a current (corresponding to the motor current) of the adjustment drive 21 configured as an electric motor such that an adjustment of the vehicle assembly 11 is effected in a desired way depending on the operating mode, namely in the automatic mode with a desired adjustment speed and in the servo mode in a power-assisted way.

The control device 3 implements a current regulation module 34 to which a setpoint current value $I_{cmd}$ is supplied, that may depend on the operating mode the current regulation module 34 receives the setpoint current value $I_{cmd}$ from a speed regulation module 32 or a servo regulation module 31.

The speed regulation module 32 here serves to specify the setpoint current value Lind in the automatic mode, so that a desired speed is obtained at the adjustment drive 21 and correspondingly a desired adjustment speed v is obtained at the vehicle assembly 11.

The servo regulation module 31 on the other hand serves to specify the setpoint current value $I_{cmd}$ such that a manual adjustment of the vehicle assembly 11 is supported in the servo mode by using a torque that is set such that the force to be additionally applied by a user is at least approximately the same over the adjustment path of the vehicle assembly 11 or follows a desired curve.

In the automatic mode, the speed regulation module 32 regulates the speed of the adjustment drive 21. To the speed regulation module 32 a setpoint speed $n_{cmd}$ is supplied via an input 320, so that the setpoint speed $n_{cmd}$ for example is stored in a memory and thus is firmly specified (as a constant value or as a speed profile over the adjustment path), but possibly can also be adapted by a user. Depending on the setpoint speed $n_{cmd}$ and the speed actually obtained at the adjustment drive 21 in the regulation mode, the speed regulation module 32 determines a setpoint current value $I_{cmd}$ which it supplies to the current regulation module 34.

In the automatic mode, the speed regulation module 32 is connected to the current regulation module 34 via a switching device 33 by switching the switching device 33 onto a switching point 330. The setpoint current value Lind output by the speed regulation module 32 thus is supplied to the current regulation module 34 so that the current regulation module 34 can perform a current regulation with reference to the setpoint current value $I_{cmd}$ received from the speed regulation module 32.

The switching device 33 can be physically implemented by a mechanical switch. In terms of software, however, the switching device 33 advantageously is implemented by the software of the control device 3. Likewise, the modules of the control device 3 may be implemented by software modules.

The control of the switching device 33 for example is effected via a control module 36 of the control device 3.

In the current regulation module 34 a current regulation is effected. The current regulation module 34 regulates the current of the adjustment drive 21 in such a way that it is set to the setpoint current value supplied to the current regulation module 34. The current regulation module 34 sets the current by using a voltage correcting value $U_{cmd}$ in the form of a load factor (between 0% and 100%) in that the voltage correcting value $U_{cmd}$ is supplied to a pulse width modulation 34 which with reference to the battery voltage $U_{bat}$ of the vehicle and the voltage correcting value $U_{cmd}$ generates an output voltage and supplies the same to the adjustment drive 21. The pulse width modulation 35, for example, operates with a comparatively high frequency, such as with a frequency between 5 kHz and 30 kHz, for example 20 kHz. With reference to the setpoint current value $I_{cmd}$ and the actually resulting current I of the actuating drive 21, the correcting value $U_{cmd}$ is set such that the motor current I is regulated to the setpoint current value $I_{cmd}$.

In the automatic mode, a regulation thus is effected in the manner of a cascade regulation in which the speed regulation module 32 determines a correcting value in the form of a setpoint current value $I_{cmd}$ and supplies the same to the downstream current regulation module 34 for current regulation.

By switching the switching device 33 onto the switching point 331, it is possible to switch into the servo mode, in which a setpoint current value $I_{cmd}$ now is supplied to the current regulation module 34 from the servo regulation module 31, but not from the speed regulation module 32. With reference to the setpoint current value received from the servo regulation module 31, a current regulation then is effected in such a way that the torque provided by the adjustment drive 21 supports the user during the adjustment of the vehicle assembly 11 and the user may have to apply a user force largely uniform over the adjustment path of the vehicle assembly 11 for the electromotively supported adjustment of the vehicle assembly 11.

The determination of the setpoint current value $I_{cmd}$ by the servo regulation module 31 is effected in dependence on the load acting on the vehicle assembly 11, which is calculated by a load calculation module 30 in dependence on the vehicle position and an opening position (indicated by the opening angle 4) of the vehicle assembly 11.

The load acting on the vehicle assembly 11 is determined from a static torque and a dynamic torque that acts about the hinge axis 110.

A static torque acting on the vehicle assembly 11 may be determined with reference to a moment obtained due to the gravity about the hinge axis 110 and in addition with reference to a friction moment acting in the hinge of the vehicle assembly 11. The static torque, referred to as static hinge moment, thus is $$M_{hinge,stat}=M_{inclination}*\cos(\alpha)+M_{inclination}\pm M_{R,hinge},$$

wherein $M_{hinge,stat}$ indicates the static hinge moment, $M_{inclination}$ indicates an inclination moment $M_{inclination}$ obtained due to a vehicle inclination and an inclination of the hinge axis 110, $M_{slope}$ indicates a slope moment obtained due to a vehicle slope and a slope of the hinge axis 110, and $M_{R,hinge}$ indicates a friction moment at the hinge.

It should be noted here that the term "cos(α)" in the above equation only is present when the inclination/slope angles are determined according to DIN ISO 8855 (corresponding to the Euler angle, which results from a roll angle, pitch angle and yaw angle). When the inclination angle (absolute) is measured, the term "cos(α)" will be omitted.

The slope moment and the inclination moment are calculated as follows:

$$M_{inclination}=x_{SP}*m*g*\sin(\alpha)*\sin(\varphi)$$

$$M_{inclination}=x_{SP}*m*g*\sin(\beta)*\cos(\varphi)$$

$$\alpha=\alpha_1+\alpha_2$$

$$\beta=\beta_1+\beta_2$$

The variables used in these equations here represent:

φ Current door opening angle [°]—offset angle $x_{SP}$ Distance door center of gravity—hinge axis [m]

m Door mass [kg]

g Gravitational acceleration [$nn/s^2$]

$\alpha_1$ Slope of hinge axis [°]

$\beta_2$ Inclination of hinge axis [°]

$\alpha_2$ Slope of hinge axis [°]

$\beta_2$ Inclination of hinge axis [°]

$M_{R,hinge}$ Friction moment of hinge [Nm]

The angles α1, α2, β1, β2 are illustrated in FIGS. 2A and 2B. The distance $x_{SP}$ between the door center of gravity SP and the hinge axis 110 is also indicated in FIG. 1. The slope of the vehicle 1 and the inclination of the vehicle 1 as well as the current position of the vehicle assembly 11 can be sensorily detected by sensors 301, 302, 303 and, correspondingly, measured values are supplied to the load calculation module 30.

The offset angle takes account of the center of gravity of the vehicle door in the transverse direction of the vehicle (Y-direction).

In addition to the static hinge moment, a dynamic hinge moment acts on movement of the vehicle assembly 11, which is calculated as follows:

$$M_{hinge,dyn}=\ddot{\varphi}*I*c$$

$\ddot{\varphi}$ here designates the acceleration of the vehicle assembly 11. The acceleration of the vehicle assembly 11 can be determined from a change of the adjustment angle ϕ. Alternatively, however, the acceleration can also be calculated from the adjustment speed v of the vehicle assembly 11, which in operation is supplied to the servo regulation module 31.

In the above equation, I represents the inertia of the vehicle assembly 11. The factor c enables the adjustment of a dynamic haptics and can assume values between 0% and 100%. When c=100%, a change in dynamics during acceleration of the vehicle assembly 11 is compensated substantially motorically. When c=0%, a user himself must apply a change in force during an acceleration.

In addition to such static and dynamic load forces, a torque is obtained at the vehicle assembly 11, which is caused by the user force. The user torque here is $$M_{user}=F_{user}*l_{handle}$$

with $F_{user}$ Desired operating force [N]

$l_{handle}$ Distance handle position—hinge axis [m]

$M_{user}$ User-generated moment [Nm]

The distance handle between the handle position of a handle 111 at the vehicle assembly 11 and the hinge axis 110 is schematically shown in FIG. 1.

With reference to the static hinge moment, the dynamic hinge moment and the user torque, a moment balance can be drawn up in order to determine a setpoint hinge moment to be provided by the adjustment drive 21. The moment balance here is as follows:

$$M_{setpoint\_hinge}=M_{hinge\_stat}+M_{hinge\_dyn}-M_{user}$$

$M_{setpoint\_hinge}$ designates the torque to be provided by the drive device 2 at the hinge axis 110. Therefrom, the servo regulation module 31 calculates the torque to be provided by the adjustment drive 21 by taking account of a gear ratio of the drive device 2.

$$M_{setpoint\_drive}=M_{setpoint\_hinge}*gr_{lever}$$

$gr_{lever}$ designates the gear ratio of the kinematics of the drive device 2 for translating an adjusting force provided by the door drive device 2 between the vehicle assembly 11 and the vehicle body 10 at the site of the adjustment drive 21 into an adjusting force at the site of the hinge axis 110. $gr_{lever}$ is dependent on ϕ, and the dependency is stored in the system for example in the form of a look-up table.

The setpoint moment of the motor is calculated from the setpoint torque of the drive by taking account of the motor efficiency and a gear ratio of a motor transmission to obtain $$M_{setpoint\_motor}=\frac{M_{setpoint\_drive}}{\eta_{motor}*gr_{transmission}}$$

with $\eta_{motor}$ Gear ratio efficiency [ ]

$gr_{transmission}$ Transmission gear ratio [ ]

The motor current in principle is proportional to the motor torque so that the setpoint current value can be calculated from the setpoint motor torque $M_{setpoint\_motor}$ as follows:

$$I_{setpoint\_motor}=\frac{M_{setpoint\_motor}}{Kt}+I_o$$

with

Kt Motor constant [Nm/A]

$I_o$ Motor idling current [A]

This value is supplied as setpoint current value $I_{cmd}$ from the servo regulation module 31 to the current regulation module 34 in the servo operating mode.

Figure 4:
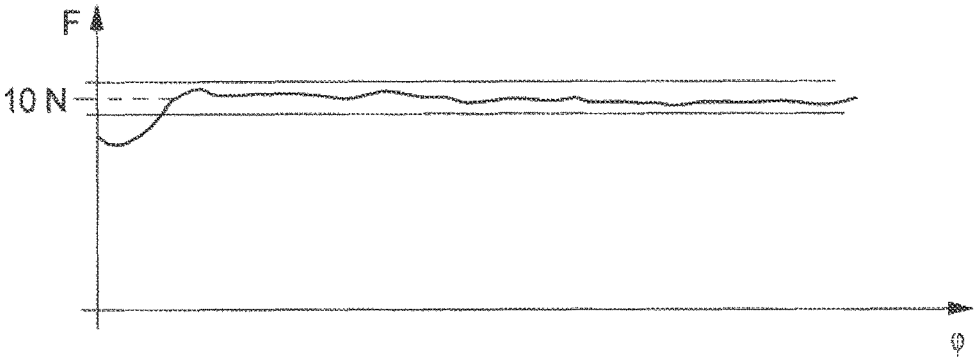
FIG. 4 shows a graphical view of an adjusting force to be applied by a user over an adjustment path of a vehicle side door in a servo operating mode.

In the servo operating mode, the setpoint current value $I_{cmd}$ thus is determined by taking account of load forces acting on the vehicle assembly 11 in such a way that a force to be applied by the user is the same over the adjustment path of the vehicle assembly 11 or follows a desired curve. Correspondingly, as is shown in FIG. 4, for example an at least approximately uniform user force F is obtained over the adjustment path of the vehicle assembly 11 (in FIG. 4 plotted over the adjustment angle 4), which for example can be set at 10 N. Thus, a user touching the door handle 111 must apply a regulated, uniform user force of for example 10 N over the adjustment path of the vehicle assembly 11 in order to effect a smooth, electromotively supported adjustment of the vehicle assembly 11.

In a holding mode—as compared to the automatic mode and to the servo mode—the vehicle assembly 11 will be retained in a position just taken. For this purpose, the actuating drive 21 is energized via the control device 3 and thus actively actuated in order to compensate a force possibly acting on the vehicle assembly 11 and to hold the vehicle assembly 11 in the position just taken.

Figure 5:
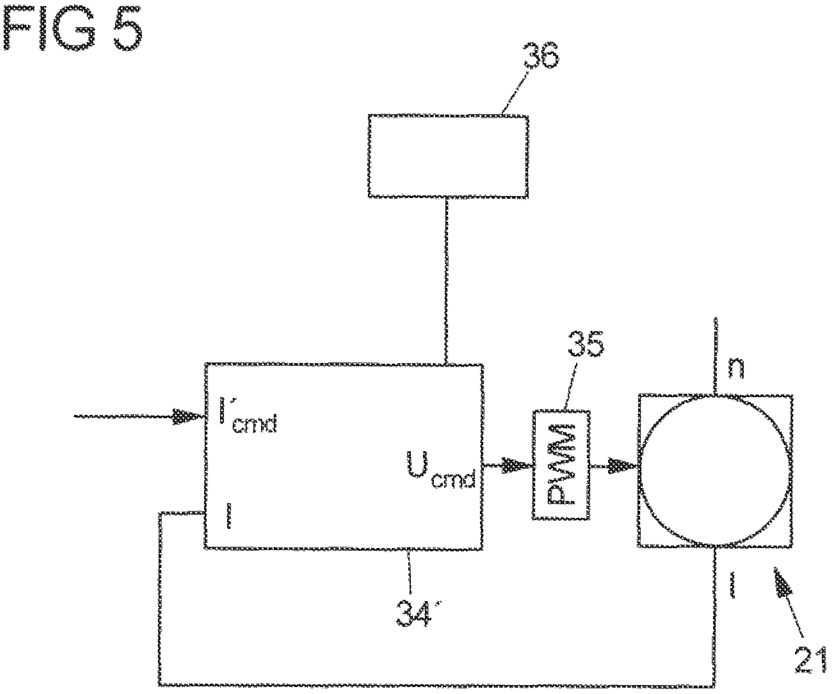
FIG. 5 shows a view of a regulation module of the control device for regulating an adjustment drive in a holding mode.

To realize the holding mode, as shown in FIG. 5, the control device 3 includes a regulation module 34' which can correspond to the current regulation module 34 as shown in FIG. 3 or can also be formed by an additional regulation module (for example in the form of a software module).

In the holding mode, the adjustment drive 21 is energized via the regulation module 34', as this is shown in FIG. 5, in that the regulation module 34' determines a correcting variable in the form of a voltage correcting value $U_{cmd}$, sets the same via a pulse width modulation 35 and supplies the same to the adjustment drive 21. Corresponding to the correcting variable in the form of the voltage correcting value $U_{cmd}$ the actual current I of the adjustment drive 21 is obtained and is supplied to the regulation module 34' which regulates the real (actual) current of the adjustment drive 21 with reference to a setpoint value $I_{cmd}'$.

In the illustrated exemplary embodiment, a current regulation thus is also effected in the holding mode.

The setpoint value $I_{cmd}'$, analogous to what has been described above, can be determined with reference to a load acting on the vehicle assembly 11 in the position just taken, and for this purpose a static hinge moment $M_{hinge,stat}$ can be determined via the load calculation module 30, as this has been described above. The static hinge moment $M_{hinge,stat}$ corresponds to the torque $M_{setpoint\_hinge}$ to be provided by the drive device 2 at the hinge axis 110, from which the torque to be provided by the adjustment drive 21 can be determined in the holding mode by taking account of a gear ratio of the drive device 2 and the setpoint value $I_{cmd}'$.

Alternatively, the setpoint value $I_{cmd}'$ can also be set in the holding mode with reference to a speed regulation (to a speed zero), by using for example a cascade regulation as described above for the automatic mode.

In the holding mode—in the illustrated exemplary embodiment—the actual motor current I thus is regulated to the setpoint value $I_{cmd}'$. In the case of a load change at the adjustment drive 21, due to a load change at the vehicle assembly 11, the motor current I will be readjusted so that it is not possible to infer a load or a load change at the adjustment drive 21 with reference to the motor current I.

Against this background, the correcting variable in the form of the voltage correcting value $U_{cmd}$ here will be monitored and evaluated by the control module 36. In the case of a load change, an adaptation of the correcting variable $U_{cmd}$ is effected in the regulation module 34' for readjusting the motor current I so that a change of the load at the adjustment drive 21 can be inferred with reference to the correcting variable $U_{cmd}$.

Figure 6:
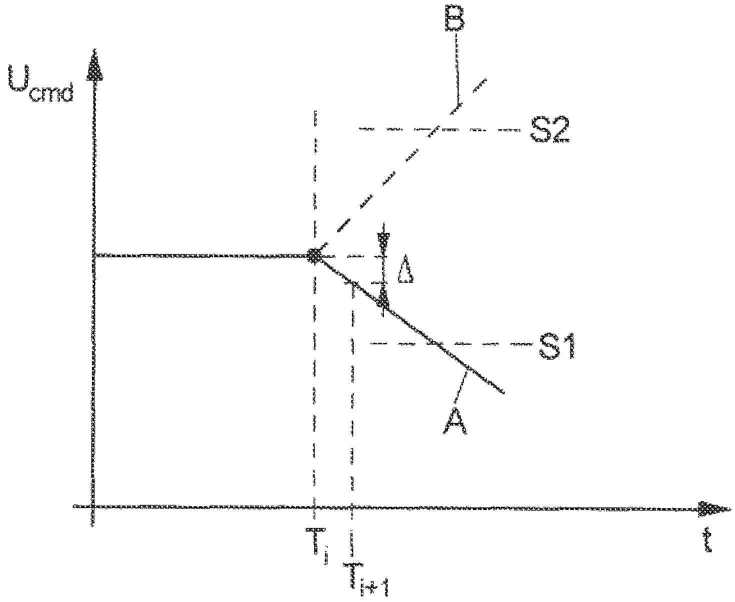
FIG. 6 shows a view of a correcting variable generated by the regulation module for actuating the adjustment drive.

With respect to FIG. 6, the correcting variable $U_{cmd}$ initially is substantially constant with a statically invariable load at the vehicle assembly 11. When a change A in the correcting variable $U_{cmd}$ is obtained at a sampling point $T_{i+1}$ (over the time t) with respect to a preceding sampling point $T_{i+1}$ and when this change A for example is larger in amount than a predetermined trigger threshold, the value of the correcting variable $U_{cmd}$ at the sampling point $T_i$ can be recorded and be set as a reference value.

Proceeding from this reference value, a further change of the correcting variable $U_{cmd}$ then is monitored. When the amount of the change of the correcting variable $U_{cmd}$ exceeds a threshold value S1, S2, it is concluded that a load is acting on the vehicle assembly 11, and, correspondingly, an adjustment request of a user is inferred and the holding mode is terminated.

The control module 36 also is configured to determine a direction of a load change. The correcting variable $U_{cmd}$ decreases (path A in FIG. 6) or increases (path B in FIG. 6) depending on the acting load, namely depending on whether the load acts in the same direction as the motor force or in a direction opposite to the motor force. In dependence on the direction of the change, it can thus be inferred whether a load exists in the direction of opening or closing at the vehicle assembly 11.

When an adjustment request is identified, the holding mode is terminated. In this case, the control device 31 can be configured to switch into the automatic mode, into the servo mode or also into a purely manual adjustment mode, so that an adjustment of the vehicle assembly 11 is initiated or enabled.

Because the detection of an adjustment request is effected with reference to a correcting variable of a regulating unit, additional sensors such as for example a gyro sensor or an acceleration sensor can be omitted at the vehicle assembly 11. Thus, the detection of an adjustment request is possible with great sensitivity and a fast response behavior.

The idea underlying the invention is not limited to the exemplary embodiments described above, but can also be realized in a different way.

A detection of an adjustment request in the holding mode has been described with reference to an exemplary embodiment by using a current regulation. Alternatively, however, a speed regulation or a regulation with reference to the position can also be effected in the holding mode.

A drive device as described above can be used for adjusting a vehicle side door that is pivotally arranged on a vehicle body about a hinge axis. Likewise, a drive device can, however, also be employed for a sliding door, a liftgate or a sliding roof by applying the same control principles.

In an automatic mode, a speed-controlled adjustment of a vehicle assembly can be effected via a drive device. In a servo mode, on the other hand, power assistance is provided in such a way that a user can cause an adjustment with a uniform user force or with a user force following a desired curve over the adjustment path of the vehicle assembly, and thus the adjustment is comfortable and pleasant for a user.

In a drive device as described above, both an automatic mode and a servo mode can be realized. It is also conceivable, however, that the drive device has no automatic mode, but a servo mode, in which a setpoint current value is determined in order to perform a current regulation with reference to the setpoint current value.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1 motor vehicle
10 vehicle body
11 vehicle assembly (vehicle door)
110 hinge axis
111 handle
2 drive device
20 adjustment part (catch strap)
200 joint axis
21 adjustment drive
3 control device
30 load calculation module
301-303 sensor device
31 servo regulation module
310 event detection
32 speed regulation module
320 speed input
33 switching device
330, 331 switching point
34 regulation module
34' current regulation module
35 PWM unit
36 control module
$\alpha$1 slope angle of the hinge axis
$\alpha$2 vehicle slope angle
$\beta$1 inclination angle of the hinge axis
$\beta$2 vehicle inclination angle
$\Delta$ change
$\phi$ door opening angle
A, B path
$I_{cmd}$ setpoint current value
$I_{cmd}'$ setpoint
n speed
O opening direction
S1, S2 threshold value
SP door center of gravity
$T_i$, $T_{i+1}$ sampling point
$U_{bat}$ battery voltage
$x_{SP}$ distance pivot axis-door center of gravity
X longitudinal vehicle axis
Y transverse vehicle axis
Z vertical vehicle axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive device configured to adjust a vehicle assembly, the drive device comprising:

an electromotive adjustment drive configured to adjust the vehicle assembly; and a control device configured to control the electromotive adjustment drive and command the electromotive adjustment drive to operate in a holding mode, in which the electromotive adjustment drive is actuated to hold the vehicle assembly, wherein the control device is further configured to regulate a current of the electromotive adjustment drive and determine a correcting variable for regulating the current of the electromotive adjustment drive, in the holding mode, with reference to a specified setpoint value, wherein the control device is further configured to determine the correcting variable as a voltage value and to set a motor voltage with reference to the voltage value by using a pulse width modulation, and evaluate a change of the correcting variable to detect an adjustment request to adjust the vehicle assembly;

wherein the control device is further configured to monitor the correcting variable, to identify the adjustment request based on a comparison of the correcting variable and threshold value and to terminate the holding mode in case the adjustment request is identified.

2. The drive device of claim 1, wherein the control device is further configured to identify the adjustment request in response to the change of the correcting variable crossing a predetermined threshold value.

3. The drive device of claim 1, wherein the control device is further configured to evaluate a sign of the change of the correcting variable in order to detect a direction of the adjustment request to adjust the vehicle assembly.

4. The drive device of claim 1, wherein the control device is further configured to determine the change of the correcting variable with reference to, a difference between a value of the correcting variable at a sampling point, and a reference value of the correcting variable at a preceding sampling point.

5. The drive device of claim 1, wherein the control device is further configured to actuate the electromotive adjustment drive in a servo mode in order to provide a supporting force during a manual adjustment of the vehicle assembly by a user, wherein the control device is further configured to determine a setpoint current value based on a load acting on the vehicle assembly to regulate a current of the electromotive adjustment drive in the servo mode based on the setpoint current value.

6. The drive device of claim 5, wherein the control device is further configured to determine the load acting on a vehicle assembly based on, an inclination angle of the vehicle, measured about a longitudinal vehicle axis an inclination angle of a hinge axis of the vehicle assembly, measured about the longitudinal vehicle axis, a slope angle of the vehicle, measured about a transverse vehicle axis, a slope angle of the hinge axis of the vehicle assembly, measured about the transverse vehicle axis, and/or an opening angle of the vehicle assembly.

7. The drive device of claim 6, wherein the control device is further configured to determine and provide a setpoint torque to the electromotive adjustment drive at least partially based on the load acting on the vehicle assembly and a target force value to be applied by the user.

8. The drive device of claim 7, wherein the load acting on the vehicle assembly is determined based on a static hinge moment acting about the hinge axis of the vehicle assembly and a dynamic hinge moment acting about the hinge axis.

9. The drive device of claim 8, wherein the setpoint torque is determined by a torque balance of the static hinge moment, the dynamic hinge moment and a user moment resulting from the target force value, wherein $$M_{setpoint\_hinge}=M_{hinge\_stat}+M_{hinge\_dyn}-M_{user}$$

wherein Msetpoint_hinge indicates the setpoint torque, Mhinge_stat indicates the static hinge moment, Mhinge_dyn indicates the dynamic hinge moment and Muser indicates the user moment.

10. The drive device of claim 7, wherein the control device is further configured to determine the setpoint current value based on the setpoint torque provided by the electromotive adjustment drive.

11. A drive device configured to adjust a vehicle assembly, the drive device comprising:

an electromotive adjustment drive configured to adjust a position of the vehicle assembly; and a control device configured to command the electromotive adjustment drive to operate in a number of modes including a holding mode, in which the electromotive adjustment drive is actuated to hold the position of the vehicle assembly, wherein the control device is further configured to, determine a correcting variable and regulate a current of the electromotive adjustment drive with reference to a specified setpoint value based on the correcting variable, wherein the control device is configured to determine the correcting variable as a voltage value and to set a motor voltage with reference to the voltage value by using a pulse width modulation, detect an adjustment request to adjust the position of the vehicle assembly, in response to a change of the correcting variable;

wherein the control device is configured to monitor said correcting variable, to identify the adjustment request based on a comparison of the correcting variable and threshold value and to terminate the holding mode in case the adjustment request is identified.

12. A method of operating an electromotive adjustment drive configured to adjust a vehicle assembly between a number of positions, the method comprising:

determining, by a control device, a correcting variable;

regulating, by the control device, a current of the electromotive adjustment drive with reference to a specified setpoint value based on the correcting variable, wherein the control device determines the correcting variable as a voltage value and sets a motor voltage with reference to the voltage value by using a pulse width modulation; and detecting, by the control device, an adjustment request to adjust the position of the vehicle assembly, in response to a change of the correcting variable;

wherein the control device is configured to monitor said correcting variable, to identify the adjustment request based on a comparison of the correcting variable and threshold value and to terminate a holding mode in case the adjustment request is identified.

13. The method of claim 12, further comprising:

commanding, by the control device, the electromotive adjustment drive to operate in a holding mode, in which the electromotive adjustment drive is actuated to hold the vehicle assembly in a first position of the number of positions.

14. The method of claim 13, further comprising:

commanding, by the control device, the electromotive adjustment drive to operate in a servo mode, in which the electromotive adjustment drive provides a supporting force to the vehicle assembly, in response to the detecting step.

15. The method of claim 14, further comprising:

determining, by the control device, a setpoint current value based on a load acting on the vehicle assembly, wherein the specified setpoint value is the setpoint current value.

16. The method of claim 12, further comprising:

receiving, by the control device, a number of angles including at least one of:

an inclination angle of a vehicle, measured about a longitudinal vehicle axis an inclination angle of a hinge axis of the vehicle assembly, measured about the longitudinal vehicle axis, a slope angle of the vehicle, measured about a transverse vehicle axis, a slope angle of the hinge axis of the vehicle assembly, measured about the transverse vehicle axis, and an opening angle of the vehicle assembly; and determining, by the control device, a load acting on the vehicle assembly, in response to receiving the at least one of the number of angles.

* * * * *